United States Patent [19]
Koller et al.
[11] 4,115,056
[45] Sep. 19, 1978

[54] METHODS FOR DYEING OR PRINTING USING AMINO-ANTHRAQUINONE REACTIVE DISPERSE DYES

[75] Inventors: Stefan Koller, Ramlinsburg; Urs Karlen, Magden; Werner Kneubühler, Bükten; Raymond Défago, Riehen, all of Switzerland

[73] Assignee: Ciba-Geigy AG, Basel, Switzerland

[21] Appl. No.: 847,062

[22] Filed: Oct. 28, 1977

Related U.S. Application Data

[62] Division of Ser. No. 773,403, Mar. 1, 1977, which is a division of Ser. No. 689,985, May 26, 1976, Pat. No. 4,044,029.

[30] Foreign Application Priority Data

May 26, 1975 [CH] Switzerland ........................ 6716/75
May 26, 1975 [CH] Switzerland ........................ 6717/75

[51] Int. Cl.[2] ........................ C09B 1/00; C09B 1/16; C09B 1/40

[52] U.S. Cl. ........................ 8/39 B; 8/1 A; 8/1 D; 8/1 G; 8/1 L; 8/1 UA; 8/2.5 A; 8/21 B; 8/54; 8/178 R; 106/22; 260/272; 260/376

[58] Field of Search ............ 8/2.5 A, 1 A, 1 D, 1 G, 8/1 L, 1 UA, 39 B, 163; 106/22; 260/272

[56] References Cited

U.S. PATENT DOCUMENTS

| | | | |
|---|---|---|---|
| 3,278,515 | 10/1966 | Schmidt-Nickels | 8/38 |
| 3,411,861 | 11/1968 | Guenthard et al. | 8/39 |
| 3,679,685 | 7/1972 | Buecheler et al. | 260/276 |
| 3,859,315 | 1/1975 | Santilli et al. | 260/377 |
| 4,044,029 | 8/1977 | Koller et al. | 260/376 |

FOREIGN PATENT DOCUMENTS

| | | |
|---|---|---|
| 841,927 | 7/1960 | United Kingdom. |
| 1,383,581 | 2/1975 | United Kingdom. |

OTHER PUBLICATIONS

Siegel, E., "Reactive Dyes: Reactive Groups" in Venkataraman's The Chemistry of Synthetic Dyes, vol VI, (Academic Press) 1972, pp. 4–9.

*Primary Examiner*—A. Lionel Clingman
*Attorney, Agent, or Firm*—Wenderoth, Lind & Ponack

[57] ABSTRACT

The present invention provides useful new fibre-reactive disperse dyes of the formula (1)

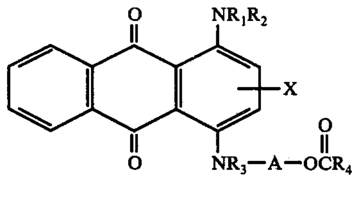

(I)

wherein $R_1$ represents hydrogen or alkyl, $R_2$ represents hydrogen, alkyl, cycloalkyl, aralkyl or substituted or unsubstituted phenyl, and $R_1$ and $R_2$, together with the nitrogen atom to which they are attached, can also form a 5- to 7-membered heterocyclic ring, $R_3$ represents hydrogen or alkyl, $R_4$ represents an alkyl radical of 1 to 6 carbon atoms which is substituted in α- and β-position, preferably only in α-position, by halogen, for example bromine and above all chlorine, or represents an α,β-unsaturated alkene radical which can be substituted in α- or β-position by halogen, such as bromine and above all chlorine, A represents an alkylene or cycloalkylene radical which optionally contains oxygen or sulphur, X represents hydrogen, chlorine, bromine, cyano, or $COOR_5$, and $R_5$ represents alkyl, a process for the manufacture of these anthraquinone dyes and a method of using them for dyeing and printing organic fibre material, in particular natural and synthetic polyamides, and the material which is dyed with these dyes.

12 Claims, No Drawings

METHODS FOR DYEING OR PRINTING USING AMINO-ANTHRAQUINONE REACTIVE DISPERSE DYES

This application is a division of application Ser. No. 773,403, filed Mar. 1, 1977, which application is in turn a division of application Ser. No. 689,985, filed May 26, 1976, now U.S. Pat. No. 4,044,029.

The present invention provides useful new fibre-reactive disperse dyes of the formula (1)

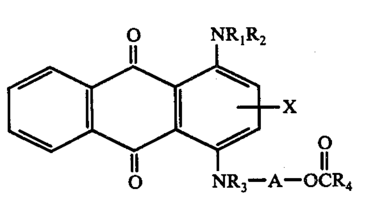

(I)

wherein $R_1$ represents hydrogen or alkyl, $R_2$ represents hydrogen, alkyl, cycloalkyl, aralkyl or substituted or unsubstituted phenyl, and $R_1$ and $R_2$, together with the nitrogen atom to which they are attached, can also form a 5- to 7-membered heterocyclic ring, $R_3$ represents hydrogen or alkyl, $R_4$ represents an alkyl radical of 1 to 6 carbon atoms which is substituted in $\alpha$- and $\beta$-position, preferably only in $\alpha$-position, by halogen, for example bromine and above all chlorine, or represents an $\alpha,\beta$-unsaturated alkene radical which can be substituted in $\alpha$- or $\beta$-position by halogen, such as bromine and above all chlorine, A represents an alkylene or cycloalkylene radical which optionally contains oxygen or sulphur, X represents hydrogen, chlorine, bromine, cyano or $COOR_5$, and $R_5$ represents alkyl, a process for the manufacture of these anthraquinone dyes and a method of using them for dyeing and printing organic fibre material, in particular natural and synthetic polyamides, and the material which is dyed with these dyes.

By fibre-reactive dyes are meant those dyes which are able to react with the hydroxy groups of cellulose or with the amino groups of natural or synthetic polyamides to form covalent chemical bonds. The fibre-reactive disperse dyes of the present invention are particularly suitable for transfer printing on polyamide.

German Offenlegungsschrift No. 1.908.096 discloses, for example, dyes of the 1-hydroxy-4-amino-$\gamma$-propyl chloride and 1-hydroxy-4-chloroacetamide type. These dyes, however, have proved to be insufficiently fibre-reactive, resulting in poor washfastness properties, and the sublimation transfer rate is not satisfactory.

U.S. Pat. No. 3,278,515 discloses in formula VII a 1,4-diaminoanthraquinone dye with the same reactive groups as in the present invention. However, since this dye contains a water-solubilizing group it is not sublimable and is unsuitable for sublimation transfer printing.

Melliand Textilberichte, vol, 54. 1973, No. 2. pp. 161-167, discloses on page 161 in formula 2 a 1,4-diaminoanthraquinone. But this dye contains no reactive group and is therefore not suitable for transfer printing on polyamide on account of the poor wetfastness properties.

An alkyl group represented by the substituents $R_1$, $R_2$, $R_3$ or $R_5$ in this invention can be the same or different, straight-chain or branched, and is in particular a low molecular alkyl group of 1 to 4 carbon atoms, such as methyl, ethyl, propyl, isopropyl, tert.butyl.

A cycloalkyl group represented by $R_2$ is in particular the cyclohexyl group and the aralkyl group represented by $R_2$ is above all the benzyl or phenethyl group.

Preferably $R_1$ and $R_3$ are hydrogen and $R_2$ is alkyl of 1 to 4 carbon atoms or cyclohexyl.

A 5- to 7-membered heterocyclic ring formed by $R_1$ and $R_2$ together with the nitrogen atom to which they are attached is, for example, the piperidine, pyrrolidine or morpholine radical.

A phenyl radical represented by $R_2$ can contain substituents. Possible substituents are in particular: alkyl groups, such as methyl, ethyl or isopropyl; alkoxy groups, such as methoxy or ethoxy; acylamino groups, such as acetylamino or benzoylamino; and halogen atoms, such as chlorine or bromine.

The fibre-reactive dyes of the formula (1) are obtained by reacting an anthraquinone compound of the formula (2)

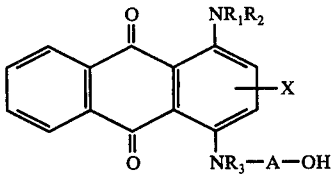

(2)

wherein $R_1$, $R_2$, $R_3$, A and X are as defined in formula (1), with an acylating agent which introduces the reactive group

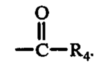

The anthraquinone compounds of the formula (2) are known and can be obtained by methods which are known per se.

Suitable acylating agents are anhydrides or halides, in particular the chlorides or bromides, of aliphatic carboxylic acids of the formula $R_4COOH$, wherein $R_4$ is as defined in formula (1). Examples thereof are: chloroacetic anhydride, or the chlorides or bromides of acetic acid, acrylic acid, methacrylic acid, crotonic acid, or $\alpha,\beta$-dibromopropionic acid.

The acylation can be carried out in known manner. Advantageously it is carried out using acid acceptors, such as sodium carbonate, potassium acetate, sodium hydroxide or organic amines, such as tetraethylenediamine, triethylamine, tributylamine, triethanolamine or pyridine, preferably in an inert organic solvent.

Examples of suitable inert organic solvents are: acetone, dioxane, methyl ethyl ketone, toluene, chlorobenzene, trichloroethylene, tetrachloroethane or dimethyl formamide.

The reaction is preferably carried out at low temperature, and the choice of the appropriate temperature depends primarily on the starting materials and the acylating agent. Advantageously the process is carried out at temperatures between 20° and 80° C. It is often advantageous to use a slight excess of acylating agent.

The procedure for obtaining the dyes of the present invention is as follows. The anthraquinone compound of the formula (2) is dissolved in a portion of the solvent and, together with an acid acceptor, charged into a reaction vessel. Then the acylating agent, dissolved in the remaining portion of the solvent, is slowly added dropwise while either cooling or gently heating, depending on the reactivity of the mixture. The acylation is complete after a reaction time of 1 to 3 hours with constant stirring. The resultant dye is isolated either by distilling off the solvent or by crystallisation, for example by adding other solvents or water to the reaction mixture.

The dyes of the present invention are suitable for dyeing and printing a wide variety of fibres, above all organic fibres, for example polyvinyl chloride, polyamide and polyurethane fibres, and fibres obtained from linear high molecular esters of aromatic polycarboxylic acids with polyhydric alcohols, for example polyethylene glycol terephthalate or poly-(1,4-cyclohexanedimethylol)-terephthalate fibres, polymers and copolymers of acrylonitrile and asymmetric dicyanoethylene, especially, however, natural and synthetic polyamide fibres, for example, both pure wool or pure polyamides as well as blends thereof and blends with other synthetic or natural materials.

Provided the machines suitable for the purpose are available, the fibre material can be printed or dyed according to the invention in any desired form, for example in the form of flocks, slubbing, yarn, texturised fibres, wovens, non-wovens from fibres, ribbons, webs, textile floor coverings, such as woven needle-felt carpets or hanks of yarn which can be in the form of webs or cut and ready finished, or the material can also be in the form of sheets.

The above fibre materials are dyed with the fibre-reactive anthraquinone dyes of this invention which are sparingly soluble in water from an aqueous dispersion. It is therefore advantageous to divide the disperse dyes of the formula (1) finely by grinding them with dispersants and possibly with further grinding assistants.

Since the dyes of the present invention are fibre-reactive and at the same time are sublimable, they are pre-eminently suitable for transfer printing. The transfer printing process can be carried out with the dyes of the present invention for example in the following way. Printing inks which contain at least one finely divided fibre-reactive disperse dye of the formula (1), optionally a binder which is stable below 230° C., water and/or an organic solvent, are applied to an inert carrier and dried, then the treated side of the carrier is brought into contact with the surface of the organic material to be dyed, carrier and material are subjected, with or without mechanical pressure, to a heat treatment of 150° C. to 230° C., advantageously 170° C. to 210° C., over the course of 2 to 60 seconds, and the dyed material is then separated from the carrier.

Very good results are also obtained by transferring under a vacuum of preferably 2 to 150 Torr, when very brief transfer times of app. 3 to 15 seconds at temperatures of 130° to 200° C. suffice.

The inert intermediate or auxiliary carrier required for the dry heat transfer, i.e., a carrier for which the dyes used according to the invention have no affinity, is advantageously a flexible, preferably three-dimensionally stable, sheet material, such as a ribbon, strip, or a foil, desirably with a smooth surface, which is stable to heat and can consist of the most varied kinds of material, above all non-textile material, e.g., metal, such as a steel or aluminum sheet, or an endless ribbon of stainless steel, plastic or paper, which can optionally be coated with a film of vinyl resin, ethyl cellulose polyurethane resin or teflon.

If necessary, the printing inks used according to the invention also contain in addition to the fibre-reactive disperse dyes at least one binder that is stable below 230° C. and acts as thickener for the printing batch and as at least temporary binder of the dye on the carrier to be printed. Synthetic, semisynthetic, and natural resins, i.e., both polymerisation and polycondensation and polyaddition products, are suitable for use as such binders. In principle, it is possible to use all resins and binders customarily employed in the printing ink and paint industry. The binders should not melt at the transfer temperature, react chemically in the air or with themselves (e.g., crosslink), have little or no affinity for the dyes used, but solely maintain these at the printed area of the inert carrier without modifying them, and remain on the carrier in their entirety after the heat transfer process. Preferred binders are those which are soluble in organic solvents and dry rapidly, for example, in a warm current of air, and form a fine film on the carrier. Suitable water-soluble binders are: alignate, tragacanth, carubin (from locust bean gum), dextrin, more or less etherified or esterified mucilages, hydroxyethyl cellulose or carboxymethyl cellulose, water-soluble polyacrylic amides or, above all, polyvinyl alcohol; and suitable binders which are soluble in organic solvents are cellulose esters, such as nitrocellulose, cellulose acetate or butyrate, and, in particular, cellulose ethers, such as methyl, ethyl, propyl, isopropyl, benzyl, hydroxypropyl, or cyanoethyl cellulose, and mixtures thereof.

The dyes dispersed in the printing ink must have in the main a particle size of $\leqq 10\ \mu$, preferably $\leqq 2\ \mu$.

Besides water, practically all water-miscible and water-immiscible organic solvents or solvent mixtures which boil at atmospheric pressure at temperatures below 220° C., preferably below 150° C., and which have sufficient solubility or emulsifiability (dispersibility) for the dyes and the binders used, are suitable for obtaining the printing inks. The following may be cited as examples of suitable organic solvents: aliphatic and aromatic hydrocarbons, for example, n-heptane, cyclohexane, petroleum ether, benzene, xylene or toluene; halogenated hydrocarbons, such as methylene chloride, trichloroethylene, perchloroethylene or chlorobenzene; nitrated aliphatic hydrocarbons, such as nitropropane; aliphatic amides, such as dimethyl formamide or mixtures thereof; and glycols, such as ethylene glycol, or ethylene glycol monoalkyl ethers, such as ethylene glycol monoethyl ether, diethyl carbonate, dimethyl carbonate, or esters of aliphatic monocarboxylic acids, such as ethyl acetate, propyl acetate, butyl acetate, β-ethoxyethyl acetate; aliphatic or cycloaliphatic ketones, for example methyl ethyl ketone, methyl isobutyl ketone, cyclohexanone, isophoron, mesityl oxide, or diacetone alcohol and alcohols, such as methanol, n-propanol, isopropanol, n-butanol, tert.butanol, sec. butanol, or benzyl and preferably ethanol.

Mixtures of these solvents, for example, a mixture of methyl ethyl ketone and ethanol in the ratio 1:1 to 1:25, are also suitable.

Particularly preferred solvents are esters, ketones, or alcohols which boil below 120° C., such as butyl acetate, acetone, methyl ethyl ketone, ethanol, isopropanol or butanol.

The desired viscosity of the printing inks can be adjusted by addition of the cited binders or by dilution with water or a suitable solvent.

The dyeing preparations of the present invention are liquid, pasty or dry. When liquid, they contain as a rule 0.1 to 80, advantageously 1 to 40, percent by weight of one or more of the fibre-reactive disperse dyes, and when dry, 10 to 80 percent by weight and optionally 0.5 to 50 percent by weight of a binder, referred to the total weight of the preparation, and they can be used direct or after dilution as printing inks according to the invention.

The suitability of the printing inks can be improved by adding optional components, for example plasticisers, swelling agents, high boiling solvents, for example, tetralin or decalin, ionogenic or non-ionogenic surface active compounds, for example the condensation product of 1 mole of octylphenol with 8 to 10 moles of ethylene oxide.

The dyeing preparations and printing inks (solutions, dispersions, emulsions) used according to the invention are obtained by methods which are known per se by dissolving or dispersing the fibre-reactive disperse dyes in water and/or a solvent or a solvent mixture, advantageously in the presence of a binder which is stable below 230° C.

The filtered or unfiltered printing inks are applied to the inert carrier for example by spraying, coating, or advantageously by printing the carrier on parts of the surface or over the entire surface.

After the printing inks have been applied to the inert carrier, they are then dried, for example, with the aid of a flow of warm air or by infrared irradiation, with or without recovery of the solvent employed.

If the carriers are printed, a wide variety of printing methods can be employed, for example relief printing (e.g., letter-press printing, flexographic printing), intaglio printing (e.g., roller printing), or silk-screen printing (e.g., rotary screen printing, flat-screen printing).

The transfer is carried out in the conventional manner by the action of heat. The treated carriers are brought into contact with the textile materials and kept at 120° C. to 230° C. until the disperse dyes applied to the carrier are transferred to the textile material. As a rule 3 to 60 seconds suffice for this.

The heat can be applied in various known ways, for example by passage through a hot heater drum, a tunnel-shaped heating zone or by means of a heated cylinder, advantageously in the presence of an unheated or heated backing roll which exerts pressure or of a hot calender, or also by means of a heated plate (warm press), the various devices being preheated by steam, oil, infrared irradiation or microwaves to the required temperature, with or without vacuum, or being located in a preheated heating chamber.

When the heat treatment is terminated the printed goods are removed from the carrier. The printed material requires no aftertreatment, neither a steam treatment to fix the dyestuff nor washing to improve the fastness properties.

The problem of attaining strong, wetfast and lightfast dyeings and prints on polyamides and mixtures thereof with synthetic and natural fibre material by means of the heat transfer process while maintaining optimum mechanical fibre properties, is virtually solved with the aid of the fibre-reactive dyes of the present invention. The prints obtained by the process of this invention are characterised by sharply delineated, finely etched contours.

The invention is illustrated by the following Examples but is not restricted to what is described therein. The parts and percentages are by weight.

EXAMPLE 1

3.1 g of 1-ethylamino-4-β-hydroxyethylaminoanthraquinone are dissolved in 50 ml of dimethyl formamide and 1 ml of pyridine. A solution of 2.56 g of chloroacetic anhydride in 5 ml of dimethyl formamide is subsequently added dropwise at 0° to 5° C. in the course of 15 minutes. After 30 minutes the temperature is increased to 20°-25° C. and the batch is allowed to continue to react at this temperature for a further 2 hours. After addition of 50 ml of methanol and 50 ml of water the dye of the formula

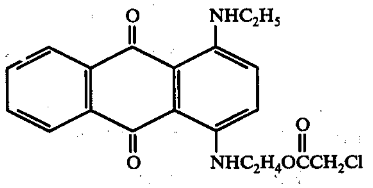

crystallizes out in pure form after some hours. It is filtered and dried in vacuo at 70° C.

EXAMPLES 2 TO 16

The procedure of Example 1 is repeated using as starting material, instead of 1-ethylamino-4-β-hydroxyethylaminoanthraquinone, compounds of the formula given below with the substituents indicated in Table 1, to yield the corresponding fibre-reactive disperse dyes.

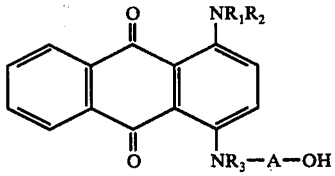

Table 1

| 1 | 2 | 3 | 4 | 5 | 6 |
|---|---|---|---|---|---|
| No | $R_1$ | $R_2$ | X | $R_3$ | A |
| 2 | —H | 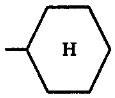 | —H | —H | $—C_2H_4—$ |
| 3 | " | $—CH(CH_3)C_2H_5$ | " | " | " |
| 4 | " | $—CH_3$ | " | " | " |
| 5 | " | $—CH(CH_3)_2$ | " | " | " |
| 6 | " | $—CH_2CH_2CH_3$ | " | " | " |
| 7 | " | $—(CH_2)_3CH_3$ | " | " | " |
| 8 | " | $—CH(CH_3)C_2H_5$ | " | $—C_2H_5$ | " |
| 9 | " | " | " | —H | $—CH(C_2H_5)CH_2—$ |
| 10 | " | " | " | " | $—C(CH_3)_2CH_2—$ |
| 11 | " | $—C_2H_5$ | " | " | " |
| 12 | " | " | " | " | $—CH(C_2H_5)CH_2—$ |
| 13 | " | " | " | $—C_2H_5$ | $—C_2H_4—$ |
| 14 | " | $CH(CH_3)_2$ | $—CH_3$ | —H | $—CH(C_2H_5)CH_2—$ |
| 15 | " | " | —CN | " | $—C_2H_4—$ |
| 16 | " | " | —Br | " | " |
| 17 | | 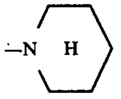 | —H | " | " |

EXAMPLE 18

3.24 g of 1-isopropylamino-4-β-hydroxyethylaminoanthraquinone are suspended in 100 ml of chlorobenzene. Then 3 ml of N,N,N',N'-tetramethylethylenediamine are added thereto. The mixture is heated to 60° C. and at this temperature a solution of 2 ml of acrylic chloride in 10 ml of chlorobenzene is added dropwise in the course of 1 hour. The solvent is then evaporated in vacuo and the residue is washed firstly with water and then with isopropanol. The residue is then dried to yield 3.2 g of the dye of the formula

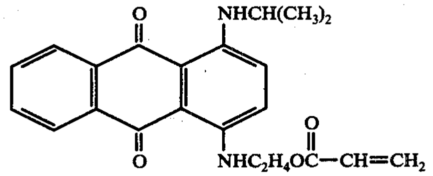

which gives very deep and washfast prints when applied to polyamide by transfer printing.

EXAMPLES 19 TO 35

The procedure of Example 18 is repeated, the anthraquinones of Table 2 being reacted with the acylating agents listed in the last column of the table to yield the corresponding fibre-reactive disperse dyes, which are also suitable for transfer printing on polyamide.

Table 2

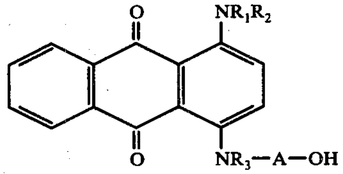

| 1 | 2 | 3 | 4 | 5 | 6 | 7 |
|---|---|---|---|---|---|---|
| No. | $R_1$ | $R_2$ | X | $R_3$ | A | acid chloride |
| 19 | —H | $-C_2H_5$ | —H | —H | $-C_2H_4$ | acrylic chloride |
| 20 | " | 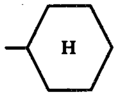 | " | " | " | " |
| 21 | " | $-CH(CH_3)C_2H_5$ | " | " | " | " |
| 22 | " | $-CH_3$ | " | " | " | " |
| 23 | " | $-CH_2CH_2CH_3$ | " | " | " | " |
| 24 | " | $-(CH_2)_3CH_3$ | " | " | " | " |
| 25 | " | $-CH(CH_3)C_2H_5$ | " | $-C_2H_5$ | " | " |
| 26 | " | " | " | —H | $-CH(C_2H_5)CH_2-$ | " |
| 27 | " | " | " | " | $-C(CH_3)_2CH_2-$ | " |
| 28 | " | $-C_2H_5$ | " | —H | $-C(CH_3)_2CH_2-$ | " |
| 29 | " | " | " | " | $-CH(C_2H_5)CH_2-$ | " |
| 30 | " | " | " | $-C_2H_5$ | $-C_2H_4-$ | " |
| 31 | " | $-CH(CH_3)_2$ | $-CH_3$ | —H | $-CH(C_2H_5)CH_2-$ | " |
| 32 | " | " | —CN | " | $-C_2H_4-$ | " |
| 33 | " | " | —Br | " | " | " |
| 34 | | 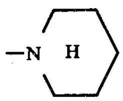 | —H | " | " | " |
| 35 | " | $-CH(CH_3)_2$ | " | " | " | crotonic chloride |
| 36 | " | " | " | " | " | methacrylic chloride |

EXAMPLE 37

(a) With cooling, 5 g of the blue dye of the formula

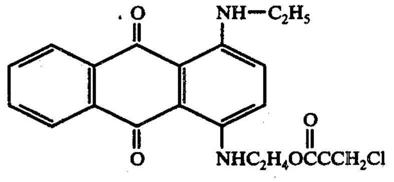

6.5 parts of ethyl cellulose and 88.5 parts of ethanol are ground for 2 hours in a ball mill and simultaneously homogenised. The grinding elements are removed and a ready for use printing ink is obtained.

(b) The printing ink is applied to the entire surface of a smooth parchment paper by printing and subsequently dried, to yield a carrier paper which is suitable for the transfer printing process.

(c) A polyamide 66 fabric is laid on this pretreated carrier and brought into contact with the treated side of the carrier by applying pressure. Carrier and fabric are then heated for 30 seconds to 210° C. using a heated plate. A second, unheated, insulated plate ensures uniform contact. The colored fabric is then separated from the carrier.

A polyamide fabric which is dyed a strong blue color and has excellent wash- and lightfastness properties is thereby obtained.

EXAMPLE 38

The procedure of Example 37 is repeated, but using corresponding amounts of the dye of the formula

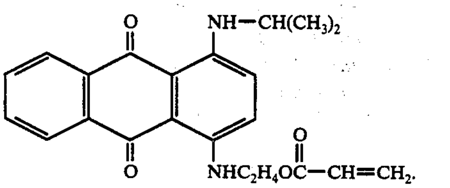

If a blend of wool and polyamide is used as printing substrate, a strong blue dyeing with good tone-in-tone shade, good lightfastness and very good wetfastness properties is obtained.

EXAMPLE 39

2 g of the dye obtained in Example 1 are dispersed in 4000 ml of water. To this dispersion are added, as swelling agent, 12 g of the sodium salt of o-phenylphenol and 12 g of diammonium phosphate, and 100 g of polyethylene glycol terephthalate yarn are dyed therein for 1 ½ hours at 95° to 98° C. The dyeing is rinsed and given an aftertreatment with aqueous sodium hydroxide solution and a dispersant.

A blue, washfast dyeing is obtained.

We claim:

1. In a method for the dyeing or printing of organic fiber material selected from the group of synthetic polyamide, natural polyamide and mixtures thereof which comprises contacting the said fiber with a dyestuff therefor, the improvement according to which the dyestuff is a reactive disperse dye of the formula

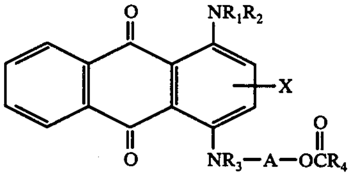

wherein $R_1$ and $R_2$ together with the nitrogen atom to which they are attached form a 5- to 7-membered heterocyclic ring $R_3$ represents hydrogen or alkyl, $R_4$ represents an alkyl radical of 1 to 6 carbon atoms which is substituted in α-position, or in α- and β-position, by halogen, or represents an α,β-unsaturated alkene radical which can be substituted in α- or β-position by halogen, A represents an alkylene or cycloalkylene radical which optionally contains oxygen or sulphur, X represents hydrogen, chlorine, bromine, cyano or $COOR_5$, and $R_5$ represents alkyl.

2. In a dry heat transfer dyeing or printing process which comprises bringing an organic fiber material selected from the group of synthetic polyamide, natural polyamide and mixtures thereof into contact with the treated face of a carrier sheet containing at least one sublimable dyestuff, subjecting the material and carrier while in contact to a heat treatment to effect dyestuff transfer, and separating the material from the carrier sheet, the improvement according to which at least one sublimable dyestuff is a reactive disperse dye of the formula

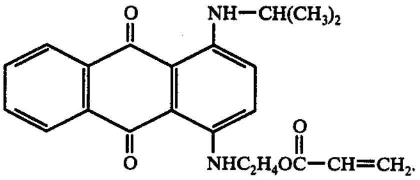

wherein $R_1$ and $R_2$ together with the nitrogen atom to which they are attached form a 5- to 7-membered heterocyclic ring, $R_3$ represents hydrogen or alkyl, $R_4$ represents an alkyl radical of 1 to 6 carbon atoms which is substituted in α-position, or in α- and β-position, by halogen, or represents an α,β-unsaturated alkene radical which can be substituted in α- or β-position by halogen, A represents an alkylene or cycloalkylene radical which optionally contains oxygen or sulphur, X represents hydrogen, chlorine, bromine, cyano or $COOR_5$, and $R_5$ represents alkyl.

3. A process according to claim 2 wherein in the active disperse dye of the formula the group $R_4COO$— represents the chloroacetyl group.

4. A process according to claim 2 wherein in the active disperse dye of the formula the group $R_4COO$— represents the chloroacroyl or chlorocrotonyl group.

5. A process according to claim 2 wherein $R_3$ represents hydrogen.

6. A process according to claim 2 wherein A represents ethylene and X represents hydrogen.

7. A process according to claim 2 which comprises applying to an inert carrier printing inks which contain at least one reactive disperse dye of the formula set forth, optionally a binder which is stable below 230° C., water and/or an organic solvent, and drying said printing inks, then bringing the treated side of the carrier into contact with the surface of the organic material to be dyed, subsequently subjecting carrier and material to be dyed, with or without mechanical pressure, to a heat treatment of 150° to 230° C. for 3 to 60 seconds, and then separating the dyed material from the carrier.

8. In a carrier for carrying out the process according to claim 2, said carrier comprising an inert sheet carrying at least one sublimable dyestuff and optionally a binder which is stable below 230° C., the improvement according to which at least one sublimable dyestuff is a reactive disperse dye of the formula

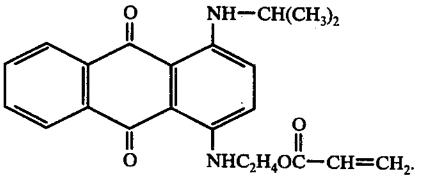

wherein $R_1$ and $R_2$ together with the nitrogen atom to which they are attached form a 5- to 7-membered heterocyclic ring, $R_3$ represents hydrogen or alkyl, $R_4$ represents an alkyl radical of 1 to 6 carbon atoms which is substituted in α-position, or in α- and $\beta$-position, by halogen, or represents an $\alpha,\beta$-unsaturated alkene radical which can be substituted in $\alpha$- or $\beta$-position by halogen, A represents an alkylene or cycloalkylene radical which optionally contains oxygen or sulphur, X represents hydrogen, chlorine, bromine, cyano or $COOR_5$, and $R_5$ represents alkyl.

9. A carrier according to claim 8 wherein the sheet material is paper, an aluminum sheet or steel.

10. A carrier according to claim 8 wherein the printing ink for the carrier sheet contains a binder which dries rapidly after application from the printing ink and forms a fine film on the carrier.

11. A carrier according to claim 8 wherein the printing ink contains at least one reactive disperse dye of the formula set forth in claim 8, optionally, a binder which is stable below 230° C., water and/or an organic solvent.

12. A carrier according to claim 8 wherein the printing ink is an organic printing ink which contains a cellulose ether or ester as binder, or an aqueous printing ink which contains polyvinyl alcohol as binder.

* * * * *